(12) United States Patent
Okazawa et al.

(10) Patent No.: US 6,709,046 B2
(45) Date of Patent: Mar. 23, 2004

(54) SUPPORTING STRUCTURE OF AN OPERATOR CAB FOR A WORK MACHINE

(75) Inventors: Kouji Okazawa, Hirakata (JP);
Mitsuhiko Kamado, Hirakata (JP);
Noboru Kanayama, Kanagawa Prefecture (JP); Shinji Mitsuta, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 25 days.

(21) Appl. No.: 09/983,643

(22) Filed: Oct. 25, 2001

(65) Prior Publication Data

US 2002/0033288 A1 Mar. 21, 2002

(30) Foreign Application Priority Data

Jan. 11, 2000 (JP) .......................... 2000-334654

(51) Int. Cl.$^7$ .............................................. B60R 27/00
(52) U.S. Cl. ............................ 296/190.07; 180/89.12; 180/89.13
(58) Field of Search ................... 296/187.01, 190.01, 296/190.04, 190.05, 190.07, 35.1, 35.2; 180/89.12, 89.13, 89.14, 89.15, 89.16

(56) References Cited

U.S. PATENT DOCUMENTS

| 3,966,009 A | 6/1976 | Meacock, II et al. |
| 4,275,918 A | 6/1981 | Franco |
| 4,460,168 A | 7/1984 | Obadal |
| 5,024,283 A | 6/1991 | Deli |
| 5,388,884 A | 2/1995 | Keehner |
| 5,498,060 A | 3/1996 | Satomi |
| 5,555,501 A * | 9/1996 | Furihata et al. ............. 296/35.1 |
| 6,168,229 B1 | 1/2001 | Kooi et al. |
| 6,273,203 B1 * | 8/2001 | Paggi et al. .............. 180/89.13 |
| 6,478,102 B1 * | 11/2002 | Puterbaugh et al. ...... 180/89.12 |
| 2002/0162697 A1 * | 11/2002 | Taylor et al. ............ 180/89.13 |

FOREIGN PATENT DOCUMENTS

| JP | 646544 | 1/1989 | |
| JP | 6470278 | 3/1989 | |
| JP | 6470279 | 3/1989 | |
| JP | 6470280 | 3/1989 | |
| JP | 01208281 | 8/1989 | |
| JP | 01208282 | 8/1989 | |
| JP | 338282 | 4/1991 | |
| JP | 404081373 A * | 3/1992 | ................ 296/35.1 |

* cited by examiner

*Primary Examiner*—D. Glenn Dayoan
*Assistant Examiner*—Lori L Coletta
(74) *Attorney, Agent, or Firm*—Varndell & Varndell, PLLC

(57) ABSTRACT

A supporting structure for an operator cab on a body frame of a work machine having a floor frame with a low floor portion and a high floor portion. A vibro-isolating support provided between the low and high floor portions so as to support the operator cab resiliently. At least one of said vibro-isolating supports located at either of the low floor portion having a support axis (M—M) or the high floor portion a having support axis (N—N) inclines longitudinally at a predetermined angle (θ) from a vertical axis toward the center of gravity (G) of the operator cab. Either one of the vibro-isolating supports is located at the low floor portion and the high floor portion having a vertical support axis.

9 Claims, 15 Drawing Sheets

SUPPORTING STRUCTURE OF AN OPERATOR CAB FOR A WORK MACHINE

TECHNICAL FIELD OF THE INVENTION

The present invention relates to an improvement in a supporting structure of an operator cab for a work machine, such as a bulldozer, wherein a supporting structure for an operator cab is mounted on a floor frame which has a front portion and rear portion different in height.

BACKGROUND OF THE INVENTION

Work machines, particularly bulldozers, are mainly used in earth work on irregular ground. The body of a work machine is subject to a large vibration during vehicle travel. A supporting structure is generally mounted between a body frame of a work machine and its operator cab to prevent the vibration from transiting to the latter through the former, which results in providing the operator with a great comfort in the cab and a stable operator posture during operation.

U.S. Pat. No. 5,498,060 issued on Jun. 18, 1999, assigned to the assignee of the present invention, discloses a floor frame supporting structure of a work machine such as bulldozers. As shown in FIG. 19, a cab 41 is mounted on a floor frame 42 having substantially Z-shaped configuration including a front portion and a rear portion which is high than the front portion. A front right side portion and a front left side portion of the floor frame 42, as shown in FIG. 20, are respectively coupled to the body frame 43 through buffer support means 44, 44, which are supported ally in a direction of pitching movement through rubber bushings 44A, 44A on periphery of shafts 44B, 44B mounted pivotally to the floor frame 42. The rear right side portion and the rear left side portion of the floor frame are respectively supported by the supporting structures, which absorb vibration in the vertical and transversal directions, to a pair of brackets 46, 46 fixed to the body frame 42. The supporting structure as shown in FIG. 21 comprises a multi-layer rubber mount viscous damper 45 including a tubular resilient cushion member 47 such as rubber or plastics, a damper plate 49 and non-compressive damper oil 48 in a chamber, and are respectively secured to the front left side portion and the rear left side portion of the floor frame 42 so as to absorb transversal and vertical shock loads from the body frame 42.

Another Japanese utility model application application No. 1989-99776 applied on Oct. 27, 1988 assigned to Kubota Tekko in FIG. 22, discloses that at least one of front side portions and rear side portions of a floor frame are respectively coupled to a body frame through rubber or plastics front or rear buffer support means 53F, 53R in FIG. 23 including rubber mount members 56, 56 having a truncated cone configuration in FIG. 24. Each axis of the supporting structures are respectively oriented at an angle within the range from the their central axis so as to orient toward the center of gravity of a operator cab in the transversal direction and longitudinal direction of a work machine.

There are drawbacks associated with these convention technology described above.

U.S. Pat. No. 5,498,060 discloses that since the rubber bushings 44A, 44B of the buffer support means 44, are needed to have a sufficient rigidity to absorb vibration generated in vertical direction at the low floor portion. The rubber bushing 44A, 44B can provide an insufficient damper effect to absorb a vertical heavy shock load, such as is caused when the work machine runs over an obstruction.

With such a problem, vertical vibration of the operator cab is converted to pitching movement with respect to a shaft of the buffer support means 44. This pitching movement is absorbed by the buffer support means 45R secured to a high both side portions of the floor frame. However, since the high both side portions of the floor frame 42 are subject to pitching movement with respect to the shaft of the buffer support means 44 e.g. the rubber mount viscous dampers 45 can receive not only the shock load in the vertical direction, but also the that in the longitudinal direction of a work machine. In order to prevent from a transversal motion or rolling motion of the operator cab, a transversal spring constant of the rubber mount or the tubular rubber cushions 47 in the perpendicular direction to the support axis thereof is set to hard. Similarly, the rigidity of the tubular rubber cushions 47 in the longitudinal direction of a work machine is stronger than that in the vertical direction, e.g. the transversal movement thereof is restricted.

Therefore, the rubber mount viscous damper involves a problem in that a vertical shock load, such as is caused when the work vehicle runs over an obstruction, cannot be sufficiently absorbed by pitching movement centering around the axis of a shaft 44B.

The buffer support means 53F, 53R disclosed in U.S. Pat. No. 5,498,060 are respectively located at positions which are approximately as high as the height of each other and the support axis thereof is inclined at a angle θ to the vertical axis toward the center of gravity in the longitudinal and transversal directions so as to prevent from transversal movement of the operator cab. However, in the case that the buffer support means 53F, 53R are positioned apart from a operator cab, this invention involves problems in that the operator cab has a large displacement during longitudinal and transversal motion.

The present invention is directed to overcoming one or more of the problems described above.

Therefore it is an object of the present invention to provide such a supporting structure of an operator cab of a work machine so as to have a great absorption for accommodating a vertical movement and pitching movement from the body frame of work machine to the operator cab.

DISCLOSURE OF THE INVENTION

In a supporting structure for an operator cab on a body frame of a work machine, having a floor frame, the operator cab being mounted on the floor frame which has a low floor portion and a high floor portion spaced longitudinally from each other at a forward location and a rearward location in a side view, and a plurality of vibro-isolating support means being provided between said low and high floor portions and said body frame so as to support the operator cab resiliently, at least one of said vibro-isolating support means located at the low floor portion and the high floor portion having a support axis which inclines longitudinally at a predetermined angle (θ) from vertical axis toward the center of gravity (G).

Since lateral and longitudinal rigidity of the supporting structure can be varied depending on a inclination angle from a vertical axis at which they are secured to a bracket fixed to the body frame, setting a suitable inclination angle of the supporting structures can bring an optimum responsibility or damping effect for vertical movement, pitching movement, transversal movement and rolling movement from the body frame to the operator cab.

In a supporting structure for an operator cab on a body frame of a work machine having a floor frame including a low floor portion and a high floor portion spaced longitudinally from each other in the longitudinal direction of a work machine, a vibration mode in that the operator cab moves pitching movement centering around adjacent the support point of the supporting structures mounted vertically on either the front floor portion or the rear floor portion of the floor frame, provides an great important effect to absorb vibrations.

In the vibration mode, by inclining at a suitable angle the supporting structures mounted at least one of the front floor portion and the rear floor portion of the operator cab, the inclined support axis of the supporting structure, which a small rigidity or spring constant of the supporting structure is usually set to small along, is substantially coincident with the direction of vibration (line of action of a shock load) on pitching movement centering around a support point adjacent the other supporting structures.

This causes a restrain against the displacement of the supporting structure to reduce, which results in enabling the rigidity (spring constant) for the supporting structure mounted in a suitable inclination angle on pitching movement to be less than that of the supporting structure mounted vertically. This results in absorbing the inclined vibro-isolating support means effectively pitching movement to provide operator with a great comfort in the cab and his stable posture during operation. It should be noted that a rigidity in the direction along the perpendicular axis to the support axis of the inclined supporting structure is set to be large, for example, more than ten times that in the direction along the latter axis.

Further yet, in a supporting structure for an operator cab on a body frame of a work machine, having a floor frame, the operator cab being mounted on the floor frame which has a low floor portion and a high floor portion spaced longitudinally from each other at a forward location and a rearward location in a side view, and a plurality of vibro-isolating support means being provided between said low and high floor portions and said body frame so as to support the operator cab resiliently, at least one of said vibro-isolating support means located at the low floor having a support axis and the high floor portion having a support axis which inclines longitudinally with angles from 10 degrees to 20 degrees from a vertical axis toward the center of gravity (G) of the operator cab.

A maximum shock load and vibration, such as is caused when most of machines run over an obstruction, can be effectively absorbed by the vibro-isolating support means which support the floor frame in the predetermined angle from the vertical direction in the longitudinal direction of a work machine. An operator cab for a work machine such as a bulldozer is normally subject to a maximum shock load, such as is caused when the machine runs rearward over an obstruction. A line of action of the shock load inclines longitudinally within the range substantially from 10 degrees to 20 degrees from vertical axis. Accordingly, the vibro-isolating support means is desirably mounted so that the inclined support axis thereof is substantially coincident with a line of action of a shock load. This brings a great efficient absorption to reduce the heavy shock load.

Further yet, in a supporting structure for an operator cab on a body frame of a work machine, having a floor frame, the operator cab being mounted on the floor frame having a low floor portion and a high floor portion spaced longitudinally from each other at a forward location and a rearward location in a side view, and a plurality of vibro-isolating support means being provided between said low and high floor portions and said body frame so as to support the operator cab resiliently, at least one of said vibro-isolating support means located at the low floor portion and the high floor portion having a support axis which inclines longitudinally at an adjustable angle from a vertical axis toward the center of gravity (G) of the operator cab.

Since the angle ($\theta$) can be varied by adjusting manually within the predetermined range, the identical supporting structures can be easily adopted to use relative to a various kind of work applications by adjusting manually the inclination angles thereof.

Further yet, in a supporting structure for an operator cab on a body frame of a work machine, having a floor frame, the operator cab being mounted on the floor frame which has a low floor portion and a high floor portion spaced longitudinally from each other at a forward location and a rearward location in a side view, and a plurality of vibro-isolating support means being provided between said low and high floor portions and said body frame so as to support the operator cab resiliently, at least one of said vibro-isolating support means located at the low floor portion and the high floor portion having a support axis which inclines longitudinally at a predetermined angle ($\theta$) from a vertical axis toward the center of gravity (G) of the operator cab, the supporting structures in use are identical in all.

This lead to minimize the kind thereof and to utilize in common for all application, resulting parts management, manufacturing cost and maintenance cost can be improved remarkably.

Further yet, in a supporting structure for an operator cab on a body frame of a work machine, having a floor frame, the operator cab being mounted on the floor frame which has a low floor portion and a high floor portion spaced longitudinally from each other at a forward location and a rearward location in a side view, and a plurality of vibro-isolating support means being provided between said low and high floor portions and said body frame so as to support the operator cab resiliently, at least one of said vibro-isolating support means located at the low floor portion and the high floor portion having a support axis which inclines longitudinally at a predetermined angle ($\theta 1$) from a vertical axis toward the center of gravity (G) of the operator cab and also disposes at the high floor portion of the floor frame so that their support points (P2) are approximately positioned adjacent Seat Reference Point for operator or the center of gravity (G) of the operator cab in the vertical direction.

Since vertical movement may minimize rolling motion centering round the Seat Reference Point or the center of gravity of the operator cab, the resulting small movement provides a great absorption effect to accommodate vibration due to a heavy shock loads. This permits operator to operate in less fatigue.

Further yet, in a supporting structure for an operator cab on a body frame of a work machine, having a floor frame, the operator cab being mounted on the floor frame which has a low floor portion and a high floor portion spaced longitudinally from each other at a forward location and a rearward location in a side view, and a plurality of vibro-isolating support means being provided between said low and high floor portions and said body frame so as to support the operator cab resiliently, at least one of said vibro-isolating support means located at the low floor portion and the high floor portion having a support axis which inclines longitudinally at a predetermined angle ($\theta$) from a vertical axis toward the center of gravity (G) of the operator cab and also disposes at the high floor portion of the floor frame so that their support points P2,P2 are approximately positioned adjacent Seat Reference Point for operator or the center of gravity (G) of the operator cab in the vertical direction, the angles are set within the range substantially from 10 degrees to 20 degrees.

Vibration due to a heavy shock load, such as is caused when the vehicle runs over an obstruction, can be effectively absorbed by coupling the supporting structures between the floor frame and the body frame in the predetermine angles from a vertical axis in the longitudinal direction of the work machine.

Further yet, in a supporting structure for an operator cab on a body frame of a work machine, having a floor frame, the operator cab being mounted on the floor frame which has a low floor portion and a high floor portion spaced longitudinally from each other at a forward location and a rearward location in a side view, and a plurality of vibro-isolating support means being provided between said low and high floor portions and said body frame so as to support the operator cab resiliently, at least one of said vibro-isolating support means located at the low floor portion and the high floor portion having a support axis which inclining longitudinally within the range substantially from 10 degrees to 20 degrees from a vertical axis toward the center of gravity (G) of the operator cab and also disposing at the high floor portion of the floor frame so that their support points P2, P2 are approximately positioned adjacent Seat Reference Point for operator or the center of gravity (G) of the operator cab vertically, the supporting structures are identical in all.

This can lead to minimize the kind thereof and utilize in common for all work condition, the resulting parts management, manufacturing cost and maintenance cost can be improved remarkably.

Further yet, in a supporting structure for an operator cab on a body frame of a work machine, having a floor frame, an operator cab being mounted on said floor frame, said floor frame having a low floor portion and a high floor portion spaced longitudinally from each other at a forward location and a rearward location in a side view, and a vibro-isolating support means being provided between said low and high floor portions and said body frame so as to support the operator cab resiliently, either one of said vibro-isolating support means located at the low floor portion has a vertical support axis (M—M) or the high floor portion has a vertical support axis (N—N), another vibro-isolating support means has a support axis which inclines longitudinally at a predetermined angle ($\theta 1$) from a vertical axis and also inclines laterally at a predetermined angle ($\theta 2$) from a vertical axis toward the center of gravity (G) of the operator cab.

Since a lateral and longitudinal rigidity of the vibro-isolating support means in the vertical, lateral and longitudinal directions can be varied depending on the both angle ($\theta 1$), ($\theta 2$) from a vertical axis, the determination of a suitable angle provides an optimum responsibility, that is to say, damping effects for vertical movement of the operator cab, pitching movement, transversal movement and rolling motion of the work machine.

In the operator cab of the work machine, having a floor frame which including the low floor portion and the high floor portion in the longitudinal direction of the work machine, Vibration mode in that pitching movement around adjacent the supporting centers of the vibro-insolating support means have an important roll for a damping effect. In this vibration mode, by locating the vibro-isolating support means at position adjacent the center of vertical pitching movement and another inclined vibro-isolating support meanss toward the center of gravity in the longitudinal, the direction along the inclined support axes of the vibro-isolating support means are substantially coincident with the direction of vibration or a line of operation of a shock load at the support point on pitching movement. The rigidity of the direction extending along the inclined support axis is generally set small.

This causes a restrain against the displacement of the supporting structure to reduce, which results in enabling the rigidity (spring constant) for the supporting structure mounted in a suitable inclination angle on pitching movement to be less than that of the supporting structure mounted vertically. This results in the inclined vibro-isolating support means absorbing effectively pitching movement. Furthermore, the rigidity extending along the axis of a shaft can help to reduce that with respect to the lateral motion and the rolling motion. The resulting high damping effect provides an improved comfort in the cab to operate and a stable operator posture during performing operation by inclining the vibro-isolating support means toward the center of gravity of the cab in a transversal direction, Further jet, in a supporting structure for an operator cab on a body frame of a work machine, having a floor frame, an operator cab being mounted on said floor frame, said floor frame having a low floor portion and a high floor portion spaced longitudinally from each other at a forward location and a rearward location in a side view, and a vibro-isolating support means being provided between said low and high floor portions and said body frame so as to support the operator cab resiliently, either one of said vibro-isolating support means located at the low floor portion has a vertical support axis or the high floor portion has a vertical support axis, another vibro-isolating support means has a support axis which inclines longitudinally at a predetermined angle ($\theta 1$) from a vertical axis and also inclines laterally at a predetermined angle ($\theta 2$) from a vertical axis toward the center of gravity (G) of the operator cab. The supporting structures in use are identical in all.

This can lead to reduce the kind thereof and achieve a common use for various applications, the resulting parts management, manufacturing cost and maintenance cost can be improved remarkably.

BRIEF DESCRIPTION OF THE DRAWING

For better understanding of the present invention, reference may be made to the accompanying drawings in which.

BEST MODE FOR CARRYING OUT THE INVENTION

Figure 1:
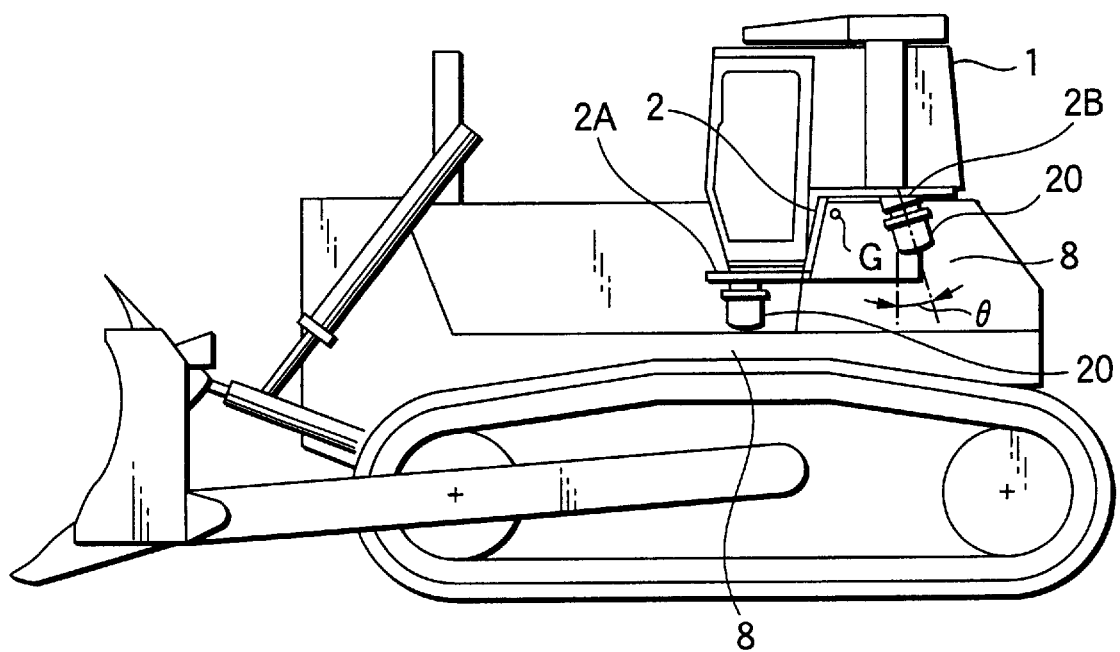
FIG. 1 is a side view of a support means for an operator cab on a work machine in accordance with a first embodiment of the present invention.

While the invention is susceptible to various modifications and alternative forms, a specific embodiment thereof has been shown by way of example in the drawing and will herein be described in detail. It should be understood, however that is not intent to limit the invention to the particular form disclosed, but on the contrary, the intention is to cover all modifications, equivalents, and alternatives failing within the spirit and scope of the invention as defined by the appended claims.

Figure 2:
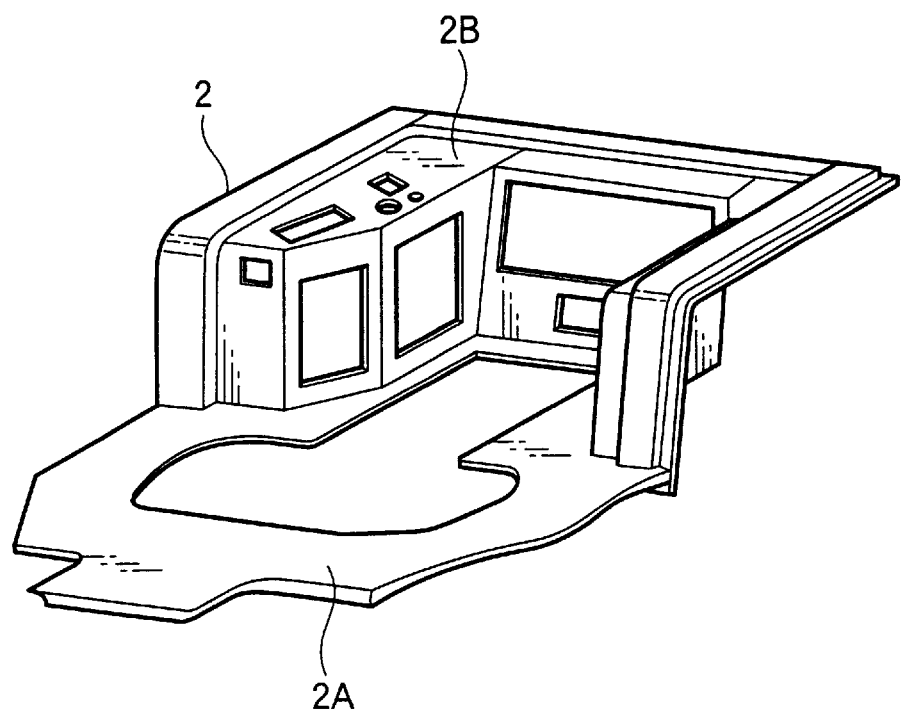
FIG. 2 is a perspective view of a floor frame of an operator cab in accordance with first embodiment of the present invention.

Referring to FIG. 1~FIG. 18, this invention will be illustrated with regard to a supporting structure of an operator cab for a work machine. The first embodiment of the supporting structures of the operator cab will be illustrated in FIG. 1~FIG. 12. FIG. 1 shows schematic view of a first embodiment of the present invention. FIG. 2 shows a perspective view of floor frame of the present invention. A floor frame 2 provided as a bottom portion of the operator cab and defined substantially S-shaped configuration taken from the side, have a low and a high floor portion 2A,2B thereof and a plate member which connects the both floor portions.

The front and rear vibro-isolating support means 20,20 are of identical in all and are coupled between the high floor portion 2A and a body frame 8 at a suitable inclination angle toward the center of gravity G of the operator cab so that they can absorb vibrations of the operator cab.

Figure 3:
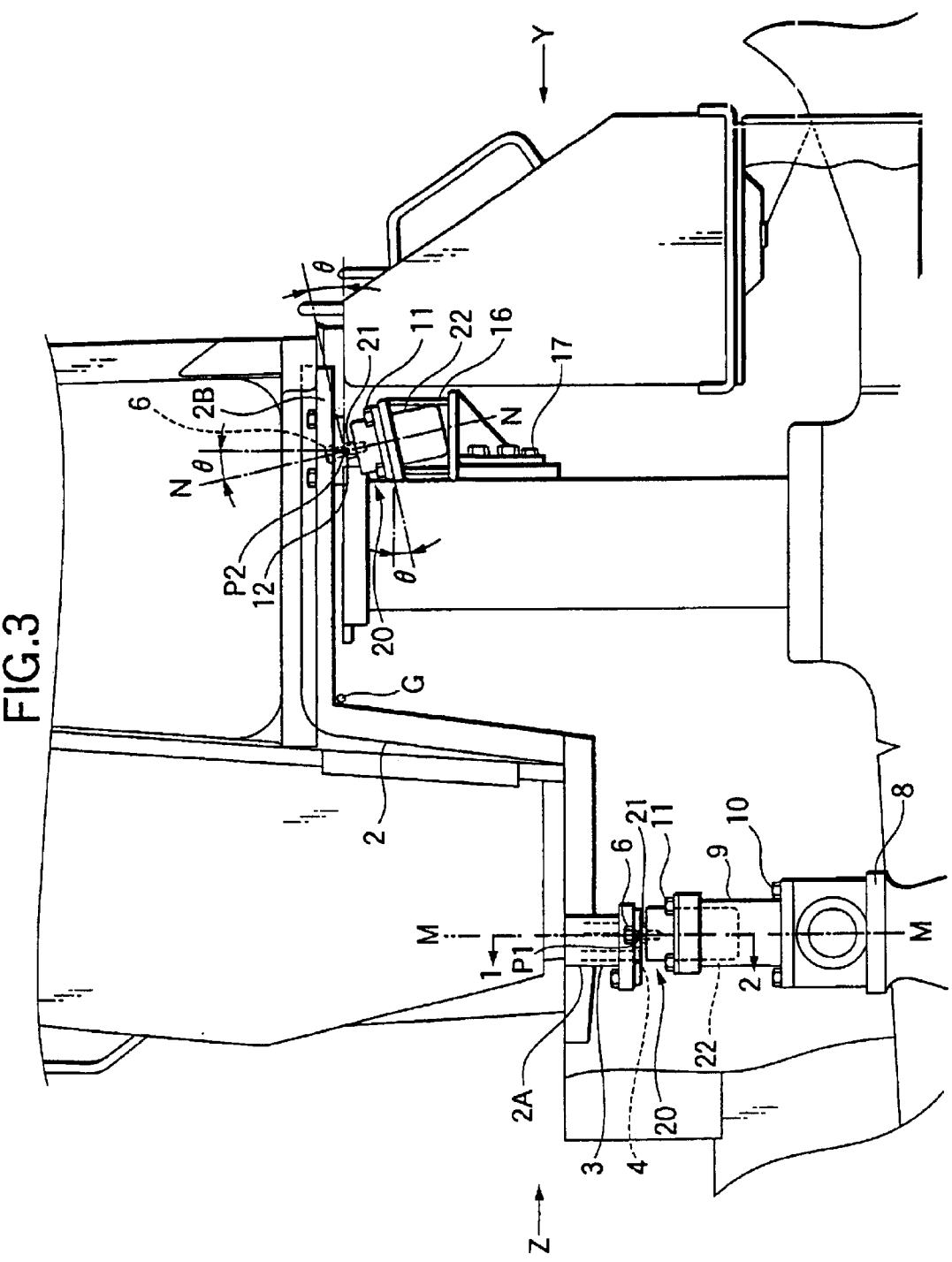
FIG. 3 is a side view of a support means for floor frame on an operator cab in accordance with first embodiment of the present invention.
Figure 4:
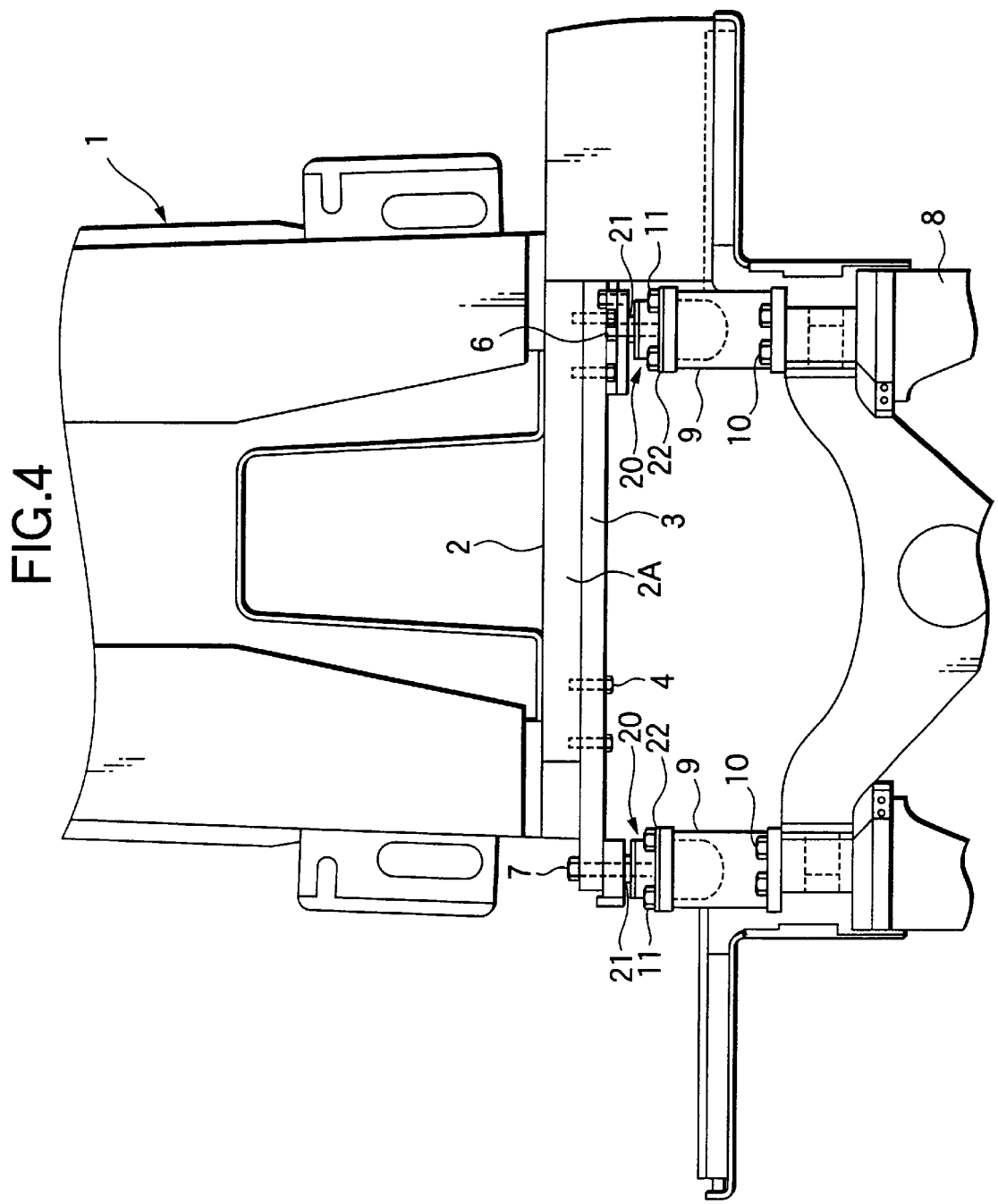
FIG. 4 is a detail view taken from Z in the side view FIG. 3.
Figure 5:
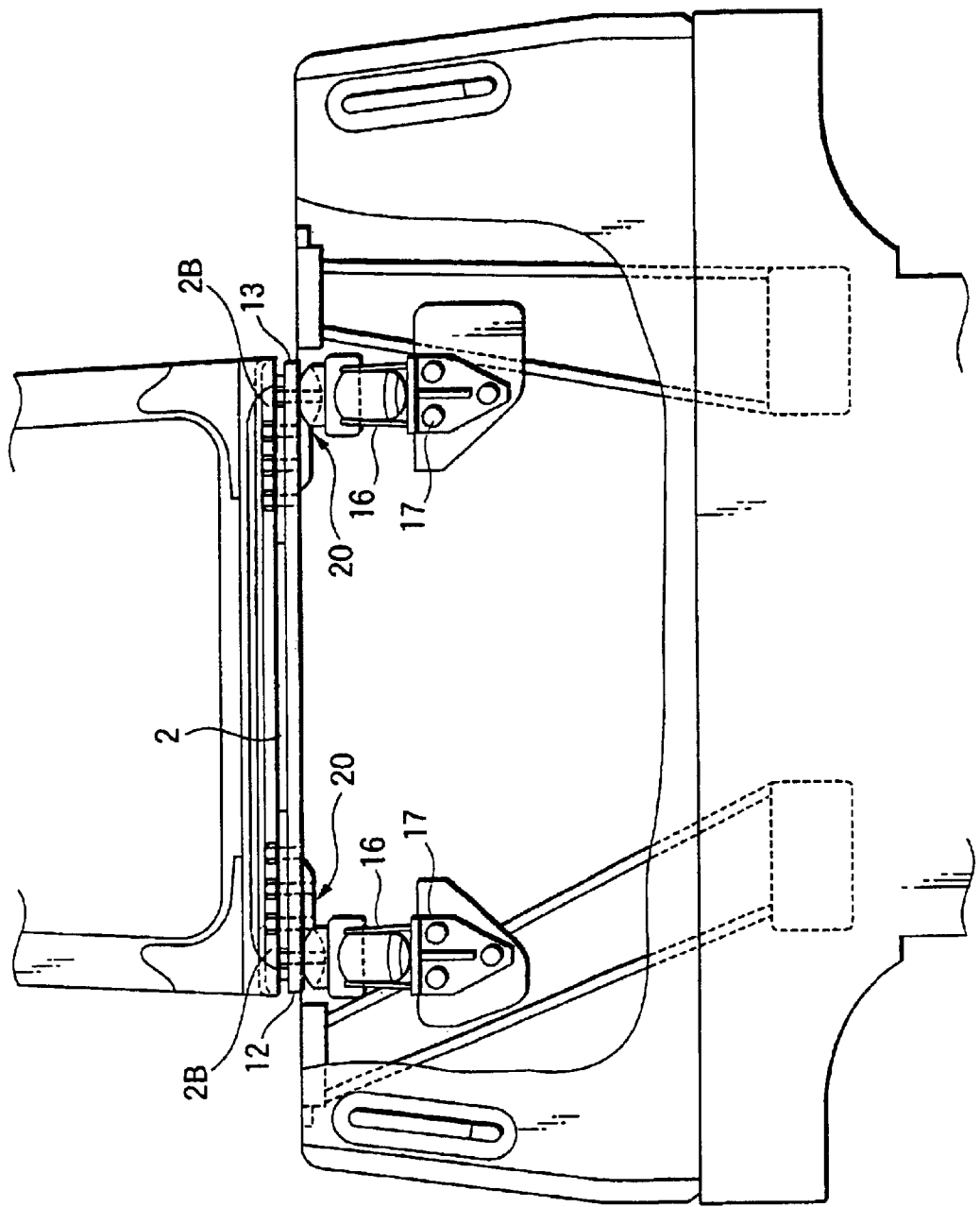
FIG. 5 is a detail view taken from Y in the side view FIG. 3.
Figure 6:
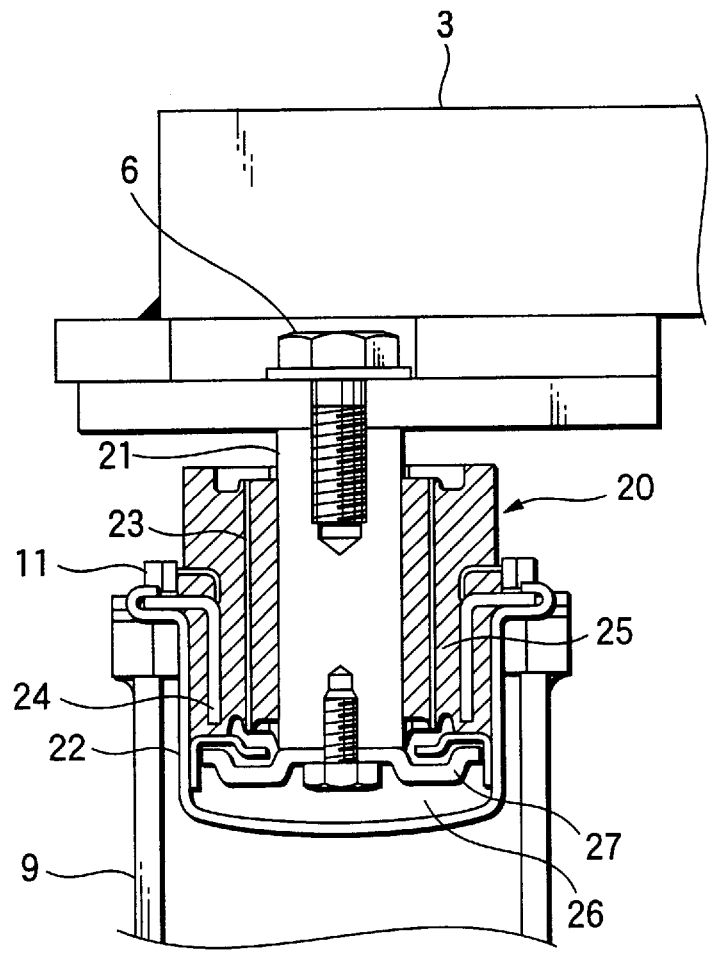
FIG. 6 is a detail view taken along line 1—1 in the side view FIG. 3.

FIG. 3 shows a side view of a cab floor frame of the present invention. FIG. 4 shows a detail view taken from S in side view FIG. 3. FIG. 5 is a front view taken from Y in side view FIG. 3. FIG. 6 shows a cross view taken along line 1—1 in side view FIG. 3. As shown in FIG. 3, FIG. 4, FIG. 6, a support 3 extending in transversal direction are fixed by a screws 4 to the outside of the low floor portion 2A of the floor frame 2. The shafts 21, 21 of the vibro-isolating support means 20, 20 are fixed by screws 6, 7 to the exterior surfaces of the support 3, 3 on both sides of the operator cab. Upright brackets 9, 9 are respectively fixed by screw 10 to the floor frame 8 corresponding to respective mounting positions of the vibro-isolating support means 20, 20. A pair of right and left vibro-isolating support means 20, 20 are fastened by the screws 11 to the exterior surface of the brackets 9, 9. With such a work, the front portion of the floor frame 2 is resiliently supported by the vibro-isolating support means 20, 20 to the body frame 8 in the vertical direction extending along a support axis M—M.

As illustrated in FIG. 3, FIG. 5, and FIG. 6, brackets 12, 13 have respectively an exterior inclining surface at an angle θ with respect to horizontal plane in the longitudinal direction of the work machine and are fixed by the screws 6 to the under surface of the high floor portion 2B. The inclined surfaces of the brackets 12,13 are secured contacting to the exterior ends of shafts 21, 21 of the vibro-isolating support means 20, 20 by the screws 6. On the other hand, the brackets 16, 16 have interior the inclined surfaces at an angle θ to a horizontal plane in the longitudinal direction corresponding to respective mounting position of the bracket 12, 13 and are fastened by a plurality of screws 17 to the body frame 8. A generally tubular case 24 of the vibro-isolating support means 20, 20 are respectively secured contacting to the exterior end of the brackets 16, 16 by screws 11. With such a arrangement, the right and left rear portions of the floor frame 2 are resiliently supported by the screws 11 to the body frame 8 with a support axis N—N of the inclined vibro-isolating support means 20, 20 from a vertical axis toward the center of gravity G of the cab 1 in the longitudinal direction. In this case, while the angle θ is determined with the range from 10 degrees to 20 degrees on actual test, the vertical positions of the rear support point P2, P2, where the shafts 21, 21 of the vibro-isolating support means 20, 20 are connected with the floor frame 2, are substantially identical to that of the center of gravity G of the operator cab 1.

The vibro-isolating support means such as a multi-layer rubber mount viscous damper 20 includes a sleeve 23 and a tubular case 24 fixed to the brackets 9 is concentrically interposed between a shaft 21 disposed in the center thereof and an outer exterior case 22. The shaft 21 disposed in the center thereof and an outer exterior case 22 are bonded by the tubular rubber cushion 25. The case 22 forms a chamber 2 having damper oil and a damper plate 27 secured to a bottom end of the shaft 21 at a low portion inside thereof. Accordingly, the rigidity Kv extending along the axis of the shaft 21 of the supporting structure 20 is small and the resulting damper effect works effectively so as to absorb a heavy shock load and a large vibrations of the floor frame. The Kh in intersect direction with respect to the axis of the shaft 21 is larger than Kv.

Next, the operations and features of the first embodiment will be explained in accordance with FIGS. 7 to 12. Generally, in the work machines having the operator cab 1 supported by the supporting structures at the right and left front support points P1,P1 and the rear right and left support points P2,P2 thereof, it could be understood that when pitching movement of the operator cab 1 is done centering around the front support points P1, an energy absorption power have a great effect for reducing vibration due to a shock load. As the result, provided are a great comfort in the operator cab 1 to drive and a stable operator posture and the like during operation.

Such being the case, a detailed explanation is required to perform regarding the rigidity against pitching movement of the operator cab 1 comparing with that of the prior art hereafter.

Figure 7:
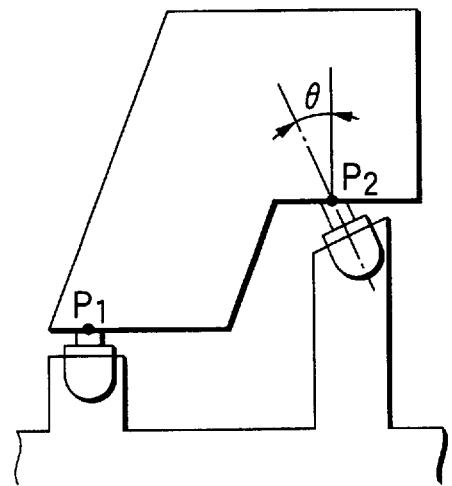
FIG. 7 is a schematic side view of a support point for an operator cab on a work machine in accordance with a first embodiment of the present invention.
Figure 8:
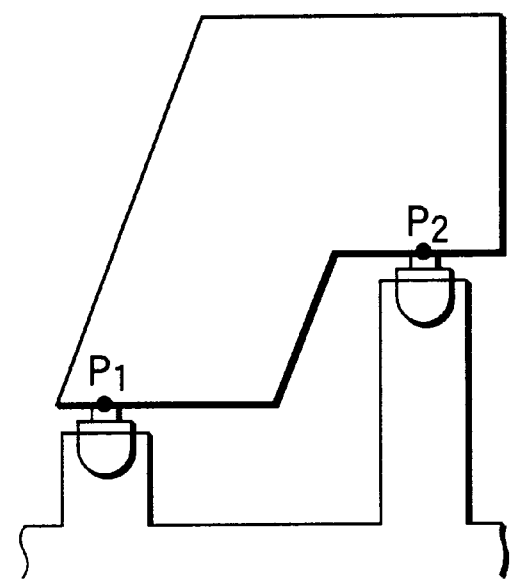
FIG. 8 is a schematic side view of a front and rear vibro-isolating support means which are mounted to a body frame vertically in accordance with a first embodiment of the present invention.
Figure 9:
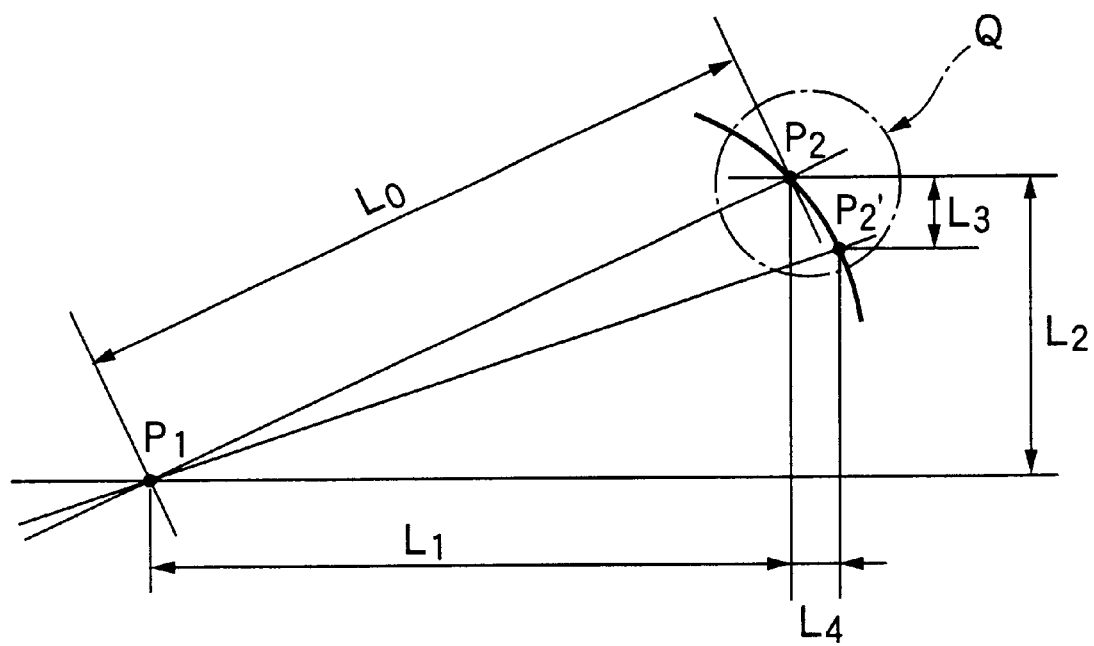
FIG. 9 is a diagram which illustrates a behavior of the rear support point P2.
Figure 10:
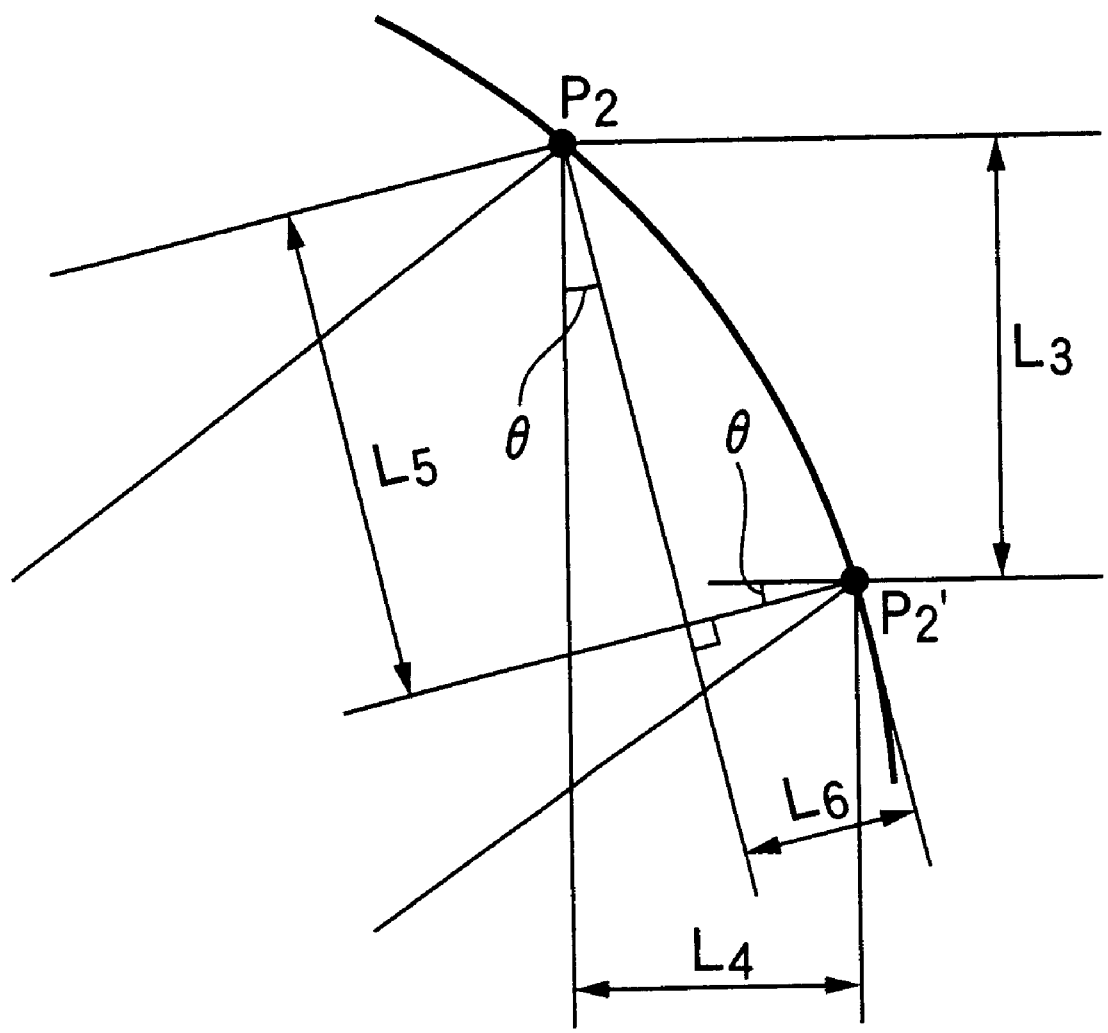
FIG. 10 is a enlarged diagram of Q portion in FIG. 9.

FIG. 7 shows a schematic side view of the supporting structure of an operator cab for a work machine. FIG. 8 shows a schematic side view of the operator cab of supporting structures for a work machine that the vibro-isolating support means 20, 20 positioned at the front right and left support points P1, P1 and the rear support points P2, P2 are vertically mounted to the body frame 2. FIG. 9 shows a diagram which illustrates a behavior of a support points P2, P2 on pitching movement of the operator cab 1. FIG. 10 shows an enlarged diagram of Q portion in FIG. 9. FIG. 11 shows a measured curve indicating the relative vertical movement of the rear support point of the present invention, such as is caused when vehicle runs rearward over an obstruction. FIG. 12 shows a measured curve indicating the relative acceleration due to gravity in vertical direction on the floor frame 2, such as is caused when the vehicle runs over flat ground. It is assumed in FIG. 9 that when the rear support points P2, P2 of the rear support points move with a radius of L0 thereof centering around the front support points P1, P1, the rear support points P2, P2 reach new positions P2', P2'. vertical and horizontal distances of the points P2', P2' are respectively L3, L4. L0, L1 and L2 are respectively designated to an actual distance, a horizontal distance and a vertical distance between the front support points P1, P1, and the rear support points P2, P2. When L1, L2 and L3 are respectively set to 100 mm, 650 mm and 10 mm, then L4 comes to 6.5 mm.

In FIG. 10, indicated by symbol θ is an inclination angles of the vibro-isolating support means at the rear right and left support points. When the rear support points P2,P2 move toward P2', P2', the displacements L5, L5 (hereafter represented by the longitudinal displacement) in the direction extending along of the axis of the vibro-isolating support means 20,20 and the displacement L6, L6 (hereafter represented by the transversal displacement) in the perpendicular direction to the axis thereof must be simultaneously done. Now, if θ is set to 15 degrees, the longitudinal displacement L5, L5 and the transversal displacement L6, L6 become respectively 11.3, 3.7.

In order to obtain the vertical and horizontal distances L3=10 mm, L4=6.5 mm of the travel amounts extending between the front support points P1, P1 and the rear support points P2, P2, requires the longitudinal displacement of L5=11.3 mm and the transversal displacement of L4=6.5 mm.

Assuming that a longitudinal rigidity KV extending along the axis of the shaft of the vibro-isolating support means 20,20 and transversal rigidity Kh perpendicular to the axis of associated shafts 21,21 are respectively 100 and 1000, an energy E1 for deforming an elastic body deform, when the rear support points P2,P2 moves toward P2', P2', can be determined as below.

Equation $$E1=(Kv{\times}L5^2+Kh{\times}L6^2)/2$$

and we obtain $$E1=1.32{\times}10^4$$

In the conventional support means shown in FIG. 8, when the rear support points P2, P2 move toward P2', P2', the rear right and left support points P2, P2 are required to move simultaneously in the longitudinal and transversal direction by L3, L4. The required energy E1 for deforming an elastic body is determined as below.

Equation $$E1=(Kv{\times}L3^2+Kh{\times}L6^2)/2$$

and we obtain $$E1=2.61{\times}10^4$$

It could be easily understood that since the rigidity of the supporting structure 20,20 on pitching movement of the present embodiment are substantially 50% smaller than that of the prior art, the vibro-isolating support means provides a great absorption to accommodate vibrations due to a heavy shock load.

Figure 11A:
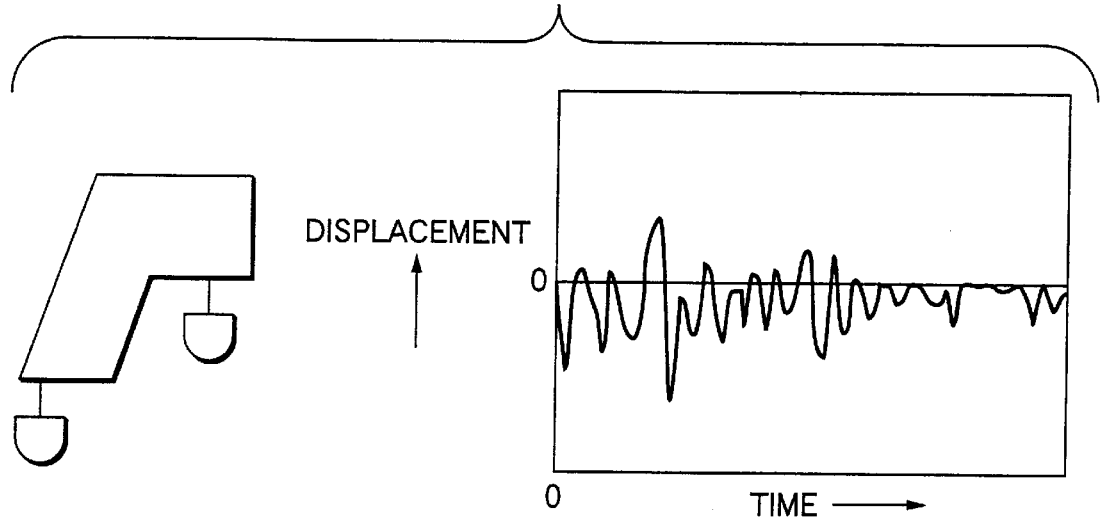
FIG. 11A is a curve indicating a vertical movement of the rear support points when the vehicle runs over an obstruction in rearward direction in accordance with the prior art.
Figure 11B:
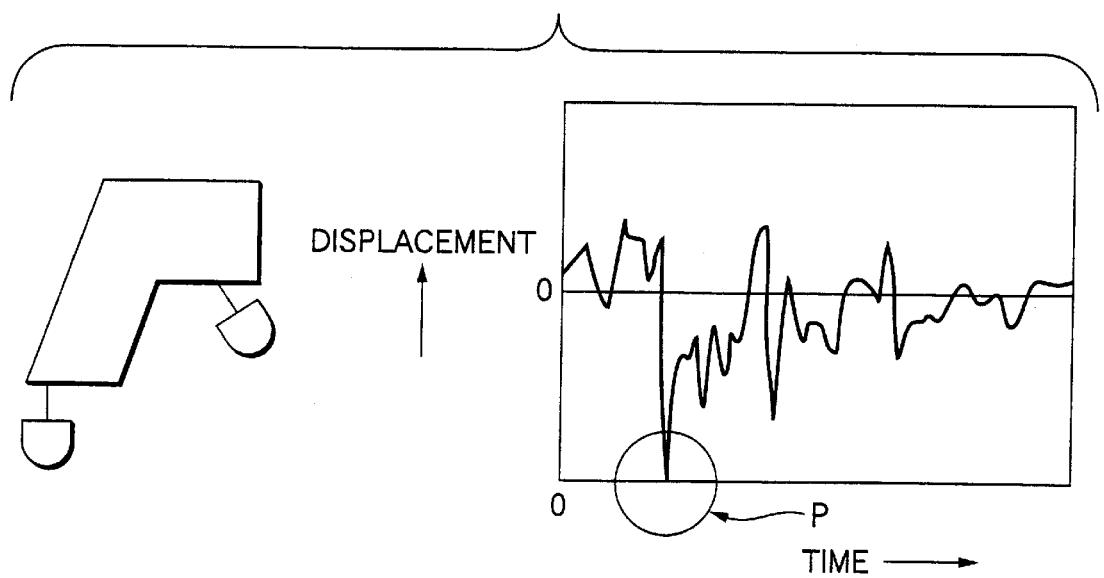
FIG. 11B is a curve indicating a vertical movement of a rear support point of the present invention when the vehicle runs rearward over an obstruction.

It could be furthermore understood as shown by P portion in FIG. 11B that since the travel displacement of the rear support points P2,P2 are larger than that of the prior art in FIG. 11A, such as is caused when the work machine runs over a obstacle and fall down ground, the displacement of the rear support points P2,P2 according to the present embodiment is low than that of the prior art and results in the vibro-isolating support means 20,20 providing a great soft damper process against a sharp shock load.

Surely, supporting the operator cab by way of the rear vibro-isolating support means at a suitable inclination angle from a vertical axis in the longitudinal direction of the work machine brings a larger vertical acceleration than that of the prior art. However, the presence of such a vertical acceleration can be ignored in practice in absorbing vibration due to a heavy shock loads as shown in FIG. 12B.

Figure 12A:
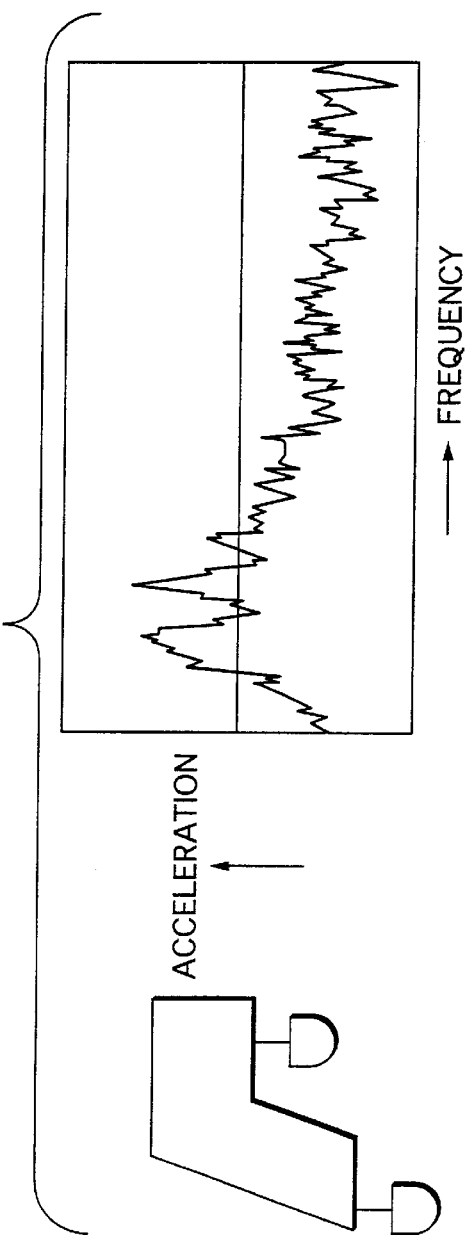
FIG. 12A is a curve indicating a vertical acceleration on a floor frame of the prior art when the vehicle runs over regular ground.
Figure 12B:
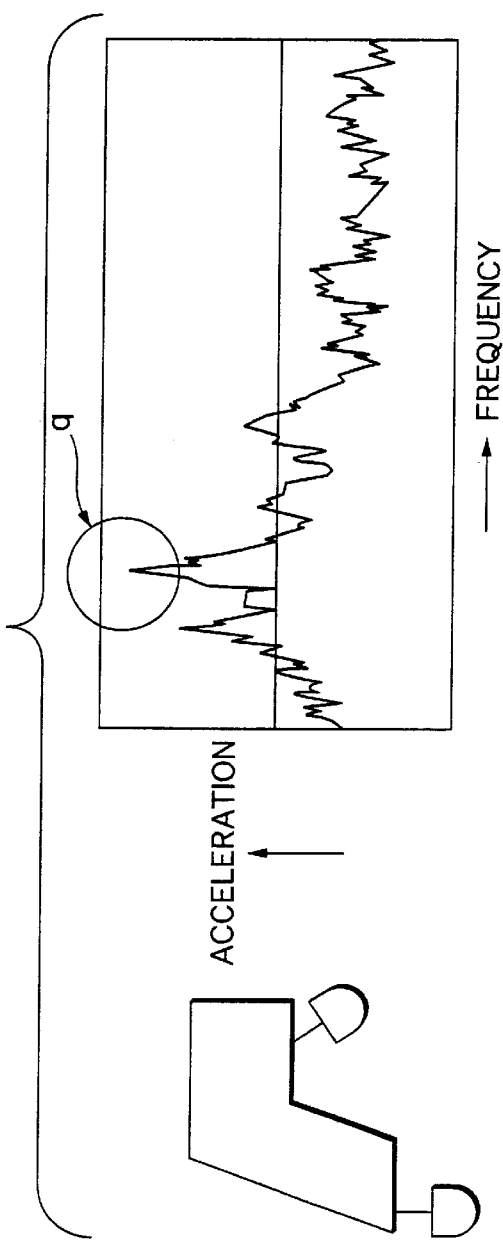
FIG. 12B is a curve indicating a vertical acceleration on a floor frame of the present invention when the vehicle runs over regular ground.

Referring to FIGS. 12A, 12B, it could be understood that although a large vertical acceleration is found somewhat larger than that of the prior art at the band of a comparative low frequency (q portion in the drawing), that does not show in the figures that a change of acceleration distribution is substantially recognized through a whole frequency range. Accordingly the vibro-isolating support means of the present embodiment also provides a sufficient effect to absorb a vertical movement, such as is caused when the work machine runs.

Furthermore, according to the present embodiment, a displacement adjacent operator or the center of gravity of the operator cab 1 can be reduced efficiently by setting the support points P2,P2 at the positions which is approximately as high as the height of Seat Reference Point or adjacent the positions of the center of gravity of the operator cab. Therefore operator can operate in less fatigue.

SRP is an abbreviation of "Seat Reference Point" (in accordance with ISO3462, SAEJ899), which represents a base point of the operator seat when operator takes a seat.

Since a great damper effect of the vibro-isolating support means can obtain by rotating suitably an angle adjusting means in response to the position of the support point. The use of identical vibro-isolating support means as all supporting structures can lead to minimize the type thereof and to utilize in common for all applications, The resulting pats management, manufacture cost and maintenance cost can be remarkably improved.

According to the present embodiment, the vibro-isolating support means are determined to mount within the range from 10 degrees to 20 degrees from a vertical axis in the longitudinal direction of the work machine. When the vehicle runs rearward over an obstruction and moves down on the ground, the angle of action of the shock load extending from the landing point of the vehicle with respect to the center of gravity of the cab 1 results in substantially coinciding with the mount angle of the vibro-isolating support means.

Thereby a generated heavy shock load can be effectively absorbed to provide a great comfort in the operator cabin.

Figure 20:
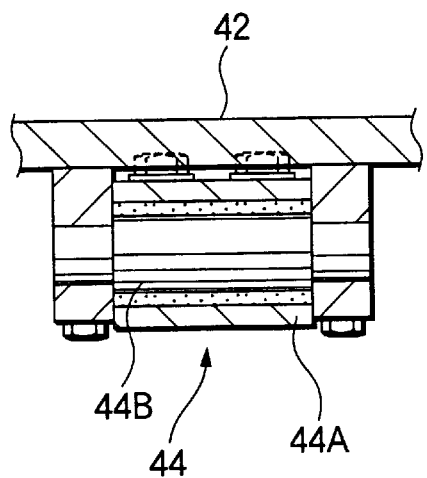
FIG. 20 is a detail view taken along line 2—2 in the side view of FIG. 19.
Figure 21:
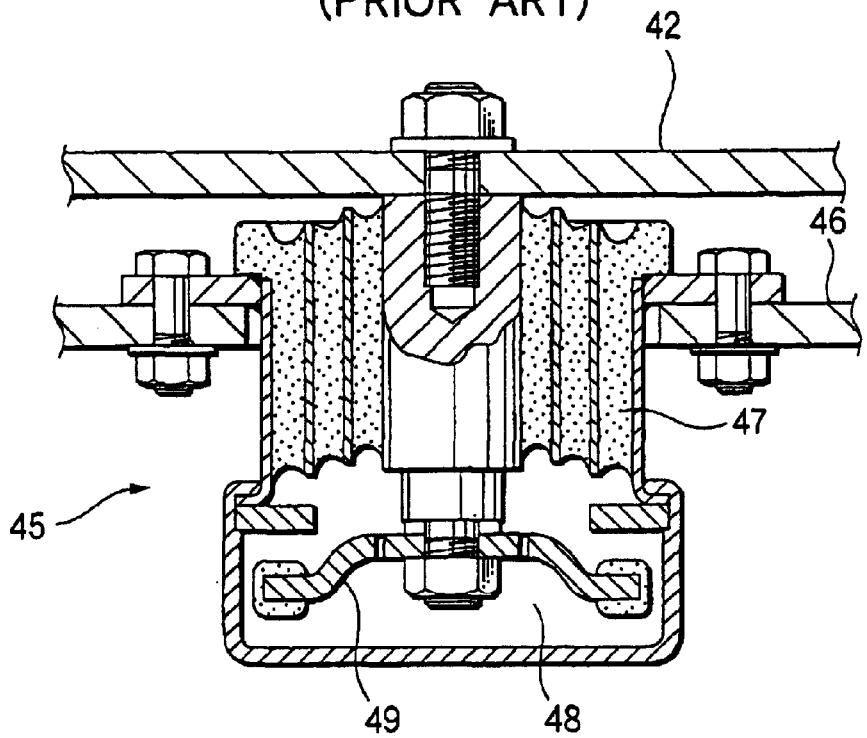
FIG. 21 is a side cross view of support means of a floor frame for an operator cab in accordance with the first prior art.
Figure 22:
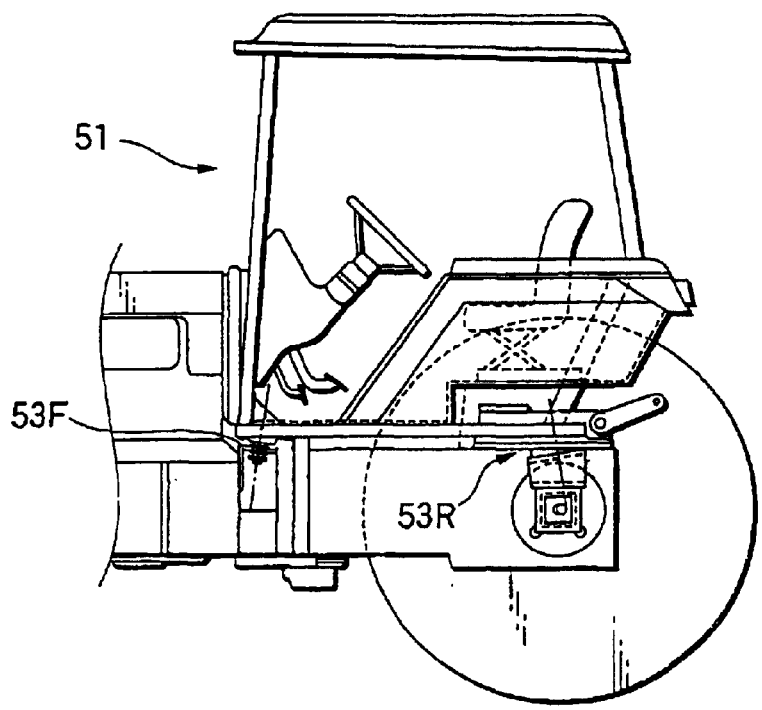
FIG. 22 is a side view of a support means of a floor frame for an operator cab on a work machine in accordance with a second prior art.
Figure 23:
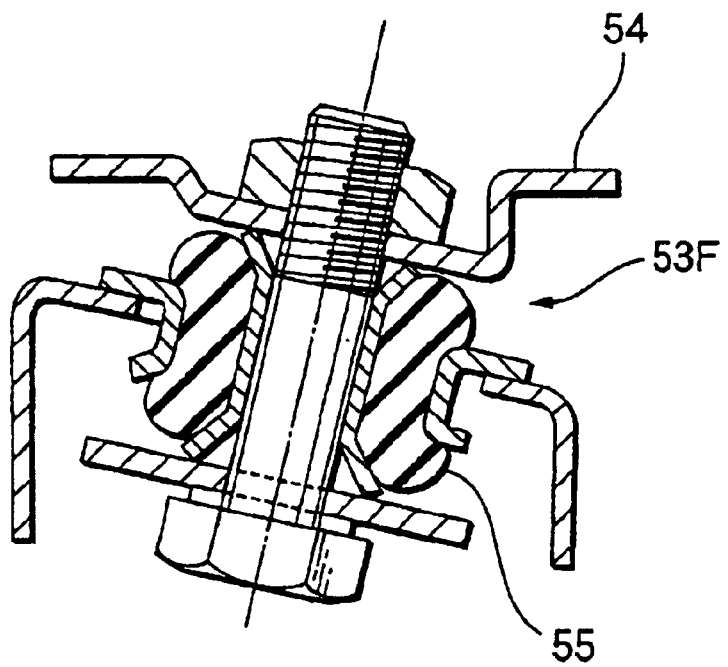
FIG. 23 is a cross view of a front support means of a floor frame for an operator cab in accordance with the second prior art.
Figure 24:
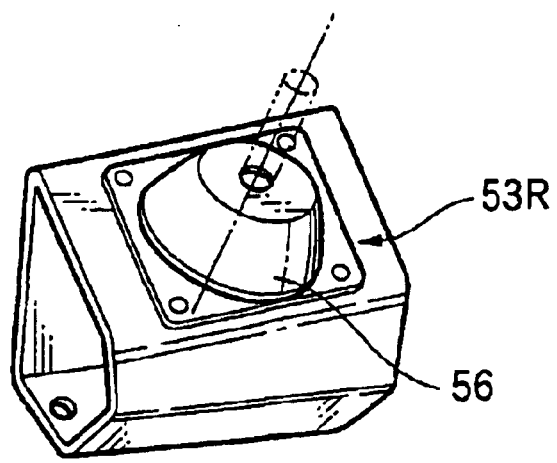
FIG. 24 is a cross view of a rear support means of a floor frame for an operator cab in accordance with the second prior art.

It goes without saying that the rear right and left supporting structure fixed at a inclination angle to the body frame provides also the same effect with respect to damper support means 44,44 including a rubber bushing in FIG. 20 or rubber or plastic buffer members 55,55 and the like in FIG. 23 as mentioned above.

Figure 13:
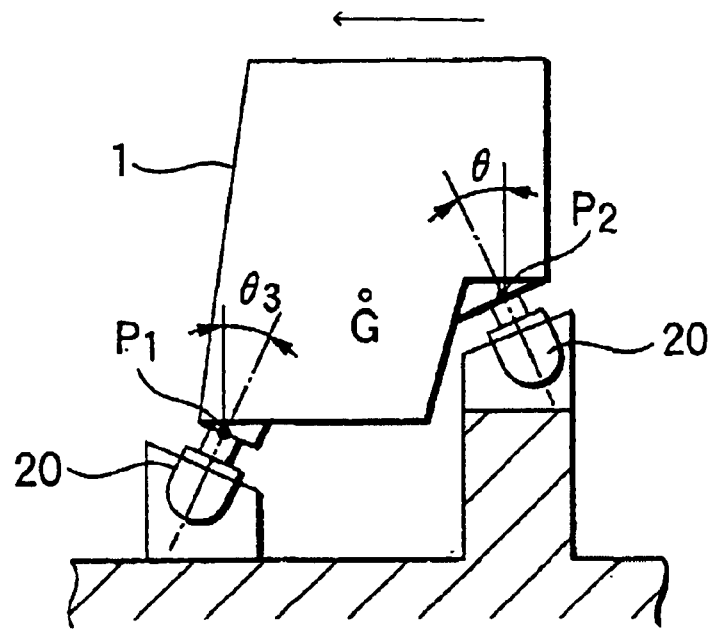
FIG. 13 is a schematic side view of a support means for an operator cab in accordance with a second embodiment of the present invention.

Next, operations and features of the second embodiment will be explained in accordance with FIG. 13. FIG. 13 shows a schematic side view of supporting structures for a operator cab in accordance with the present embodiment. Provided is that the axis of action of the front support point P1, P1 are inclined at an angle θ3 toward the center of gravity G in transversal direction, along with technology in that the axis of action of the rear support points P2, P2 are inclined at an angle θ toward the center of gravity G in the longitudinal direction of the work machine.

As the result, the vibro-isolating support means at front and the rear support point P1,P1, and P2, P2 can provide a finely well-balanced damper effect to accommodate a vertical movement and pitching movement of the operator cab. This leads to a great comfort in the cab and a stable operator posture during operation.

Figure 14:
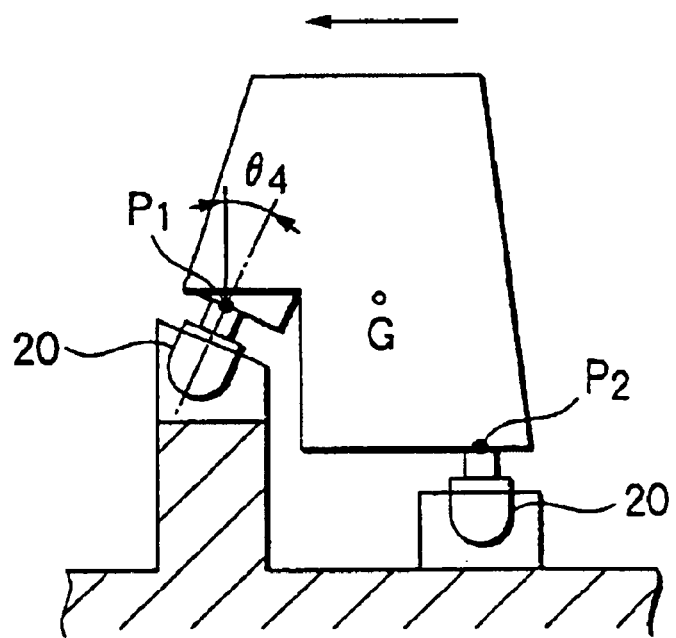
FIG. 14 is a schematic side view of a support means for an operator cab in accordance with a third embodiment of the present invention.

As shown in FIG. 14, Likewise the same is true if in another case that the high floor frame is positioned on the front portion of the floor frame and the low floor frame is positioned on the rear portion of the floor frame, the front support points P1, P1 are inclined at an angle θ4 toward the center of gravity G in the longitudinal direction of the work machine. Such a arrangement is suitably adopted to the work mahine having the operator cab at the front end portion of the vehicle and provides the same damper effect as described in the first embodiment.

Figure 15:
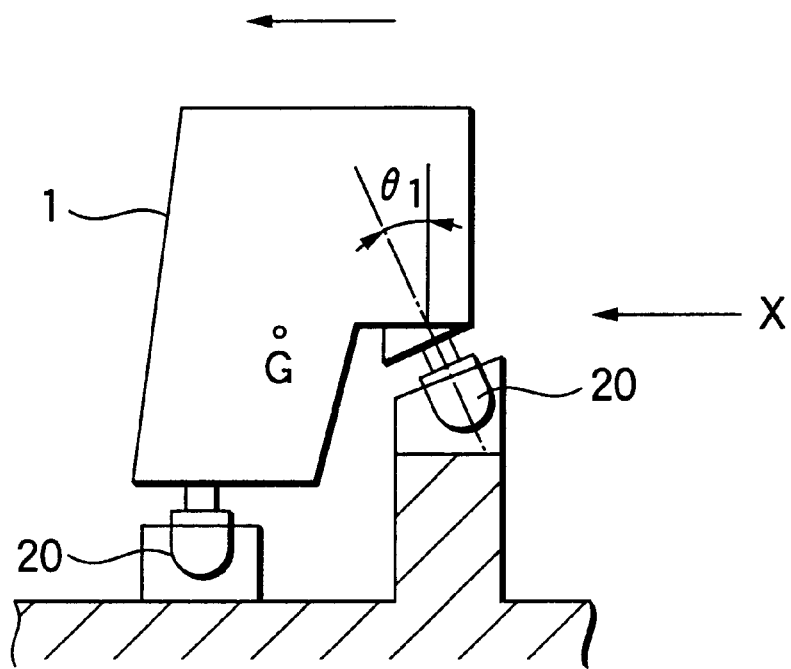
FIG. 15 is a schematic side view of a support means for an operator cab in accordance with a fourth embodiment of the present invention.
Figure 16:
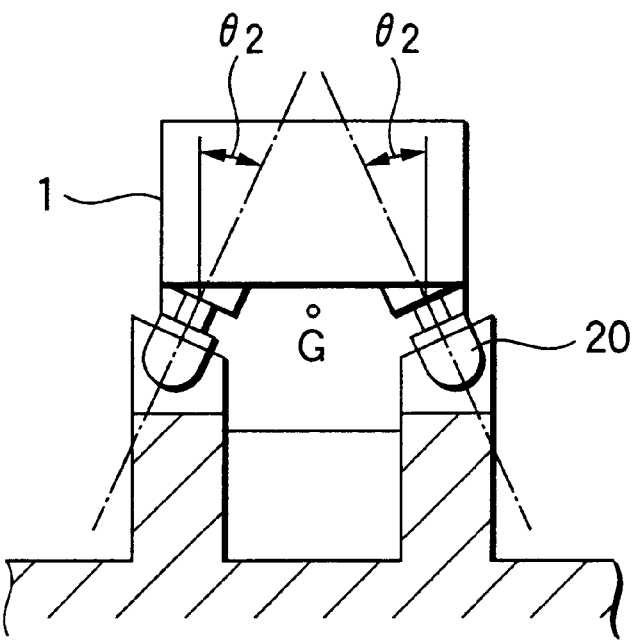
FIG. 16 is a detail view taken from X in the side view of FIG. 15.

Next, operations and features of the second embodiment will be explained in accordance with FIGS. 15, 16. FIG. 15 shows a schematic side view of supporting structures in accordance with a fourth embodiment of the present invention. FIG. 16 shows a detail view taken from X in side view FIG. 15. As shown in FIG. 15, the fourth embodiment based on the first embodiment provides that the rear support point P2 is inclined at an angle θ1 toward the center of gravity G in the longitudinal direction of the work machine and at an angle θ2 toward the center of gravity G in the transversal direction f the work machine.

This results in the supporting structures enabling control the optimum responsibility with respect to the transversal movement and rolling motion, along with the vertical movement and pitching movement. This allows operator to operate in a great comfort in the cab and having a stable posture during his operation.

Figure 17:
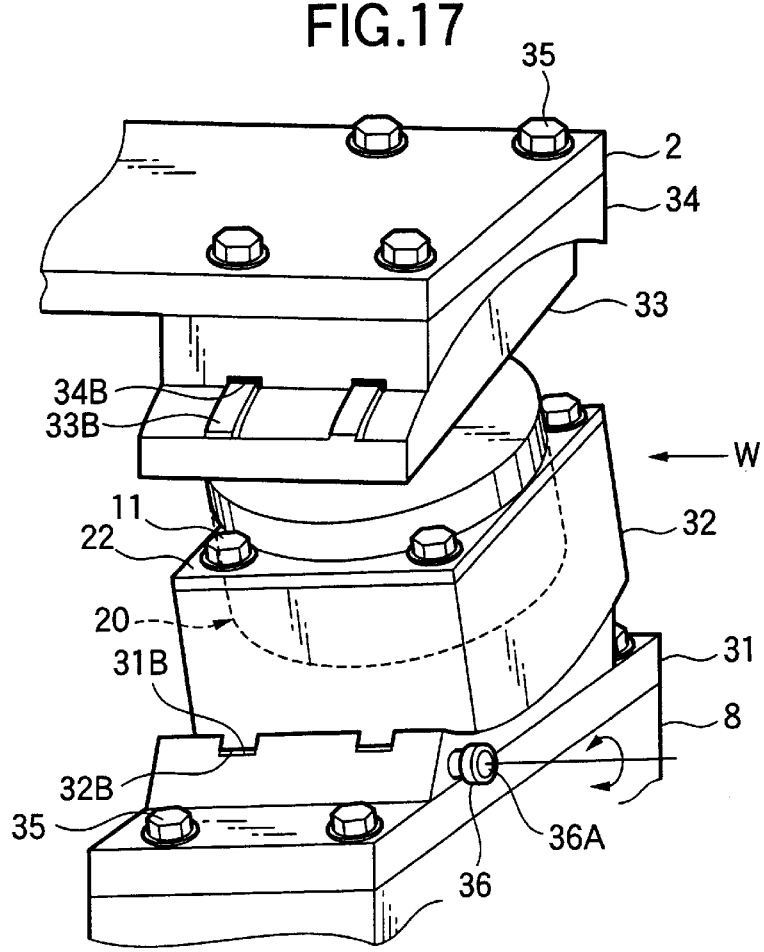
FIG. 17 is a perspective view of a support means with an angle adjusting means in accordance with a fifth embodiment of the present invention
Figure 18:
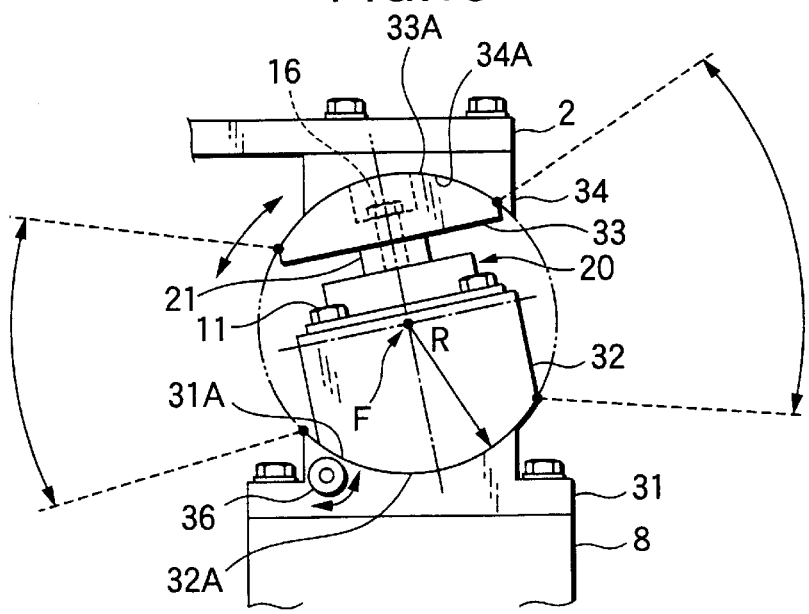
FIG. 18 is a detail view taken from W in the side view of FIG. 17.
Figure 19:
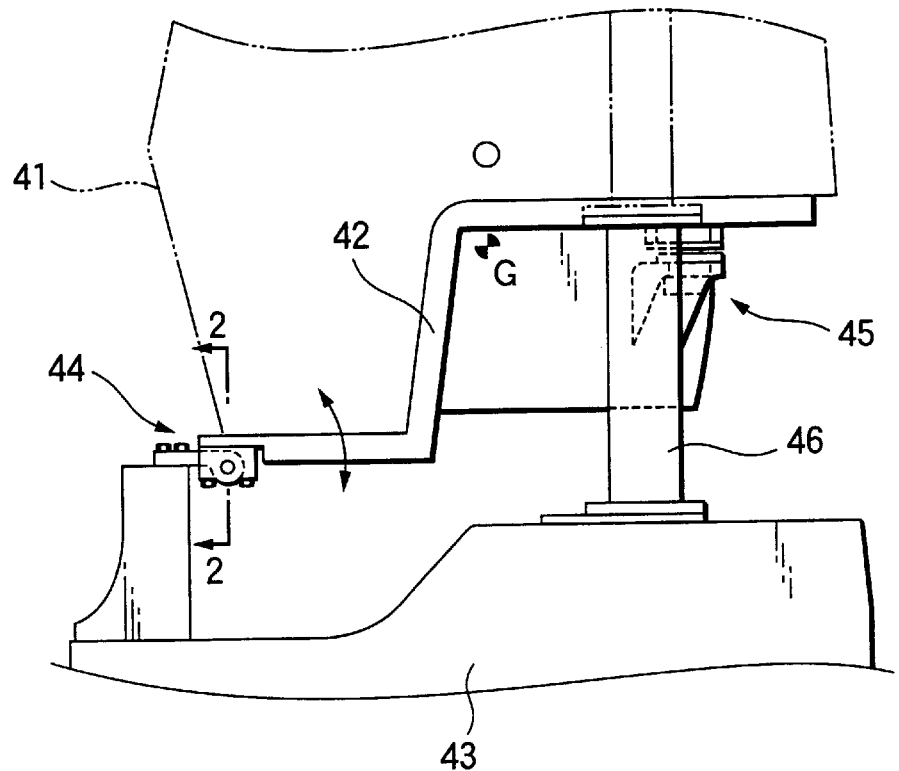
FIG. 19 is a side view of a support means of a floor frame for an operator cab in accordance with a first prior art.

The fifth embodiment will be next explained referring to FIGS. 17, 18. The present embodiment represents the supporting means with the inclination angle adjusting means. FIG. 17 shows a perspective view of the support means with the angle adjusting means in accordance with a fifth embodiment. FIG. 18 is a detail view taken from W in side view FIG. 17. FIGS. 17, 18 shows that a support means 20 includes a low brackets 31, a case 32, a plate 33, and an upper bracket 33 and an adjusting means 36 which is disposed in the low bracket 31 so as to adjust a inclination angle of the case 32 from a vertical axis. The low bracket 3 land the upper bracket 34 are respectively fixed by the screws 35 to the floor frame 2. The exterior surface of the low bracket 31 forms an interior curvature 31A having a radius R centering around a point F. Two rows of grooves 31B are formed on the interior curvature 31A. Similarly, The exterior surface of a case 32 forms an exterior curvature 32A having a radius R centering around a point F. The key grooves 31B, 31B are formed on the exterior curvature 32A. The keys 32B, 32B extruding from the exterior surface of the case 32 fit into the associated key grooves 31B, 31B disposed in the exterior surface of the low bracket 31. The exterior surface of the case 32 slides freely on the interior surface of the low bracket 31 so that the support means 20 are adjustably inclined at a suitable angle and secured to the body frame 8.

The angle adjusting means 36 including a pinion (not shown) freely rotating on the bottom of the key grooves 31B, 31B and associated rack gear (not shown) formed on the exterior surface of the keys 32B, 32B is adjusted to finely rotate the pinion gear by way of the screw 36A so that the case 32 is freely inclined at a desired angle with respect to the low bracket 31. After is the inclination angle of the case 32 determined, the low bracket 31 and the case 32 are locked by a lock means (not shown) to prevent from sliding each other.

Similarly, defined is on the exterior surfaces of the upper bracket 34 the interior curvature 34A having a radius R centering around a point F. Disposed are two key grooves 35B, 34B on the interior curvature 34A. Similarly, disposed on the exterior surface of a plate 33 an exterior curvature 33A which have a radius R centering around a point F. Disposed is the keys 33B, 33B on the exterior curvatures 33A. The vibro-isolating support means 20 is housed in the case 32 and the case 22 thereof is secured by screws 11 to the case 32. A shaft 21 of the vibro-isolating support means 20 is secured by a screw 16 to the exterior surface of the plate 33.

Next, operations and features of the vibro-isolating support means with the angle adjusting means 36 will be explained in accordance with FIGS. 17, 18. The vibro-isolating support means 20 is set to incline at a suitable angle by ad the angle adjusting means 36 with respect to the upper racket 34 and the low supporting bracket 34. This causes the floor frame 2 to be resiliently supported at a suitable inclination angle with respect to the body frame 8. With such a construction, it could be understood that the vibro-isolating support means 20 are adopted to use in the various typed machines and applications by the support means 20 with the angle adjusting means 36A described in the four embodiments.

As described above, at least one of said vibro-isolating support means located at the low floor portion having a support axis (M—M) and the high floor portion having a support axis (N—N) which inclines longitudinally at a predetermined angle (θ) from a vertical axis toward the center of gravity (G) of the operator cab. The mount of the vibro-isolating support means enables a rigidity of the operator cab to vary in the vertical and longitudinal direction. A suitable inclination angle provides an optimum responsibility with respect to a vertical movement of the operator cab and pitching movement so as to improve a comfort to drive and a stable operator posture during his operation.

Furthermore, the vibro-isolating support means are respectively mounted within a range from 10 degrees to 20 degrees from a vertical axis in the longitudinal direction of the work machine, which results in most of machine providing a great absorption to accommodate a heavy shock load, such as is caused when the vehicle runs over an obstruction. This causes the manufacturing cost for operator cab, parts maintenance due to the elimination of the kind of parts to be improved remarkably.

Furthermore, the position of the vibro-isolating support means at the high floor portion of the floor frame are closely positioned adjacent the Seat Reference Point or the center of gravity of the operator cab, thereby a vertical movement is minimized on rolling motion centering round the Seat Reference Point or the center of gravity of the operator cab. A small movement brings efficiently a great absorption against vibrations due to a heavy shock load and results operator in operating in less fatigue.

Furthermore, The identical vibro-isolating support means can be easily adopted to use in various kinds of applications by merely adjusting the inclination angles thereof. Furthermore, one of the low floor portion and the high floor portion of the floor frame is vertically supported by the vibro-isolating support means, the other is supported by the supporting structures with a predetermined inclination angles (θ1, θ2) from a vertical axis in the longitudinal direction of the work machine and the transversal direction toward the center of gravity G of the operator cab, thereby the rigidity of the cab in the vertical, longitudinal and transversal directions are varied depending on the amount of inclination angles (θ1, θ2). Adequate angle adjustment of the vibro-isolating support means provides a high responsibility with respect to vertical movement, pitching movement, the lateral movement and rolling motion of the cab. The resulting damping effect brings a highly improved comfort in the cab and a stable operator posture during operation.

Obviously, many modifications and variations of the present invention are possible in the light of the above teachings. It is, therefore, to be understood that within the scope of the appended claims, the invention may be practiced otherwise than as specially described.

What is claimed is:

1. A supporting structure for an operator cab on a body frame of a work machine, having a floor frame, said operator cab being mounted on said floor frame, said floor frame having a low floor portion and a high floor portion spaced longitudinally from each other at a forward location and a rearward location in a side view, and a vibro-isolating support means being provided between said low and high floor portions and said body frame so as to support the operator cab resiliently, comprising:

at least one of said vibro-isolating support means located at the low floor portion and the high floor portion having a support axis which inclines longitudinally at a predetermined angle (θ) from a vertical axis toward the center of gravity (G) of the operator cab.

2. A supporting structure for an operator cab on a body frame of a work machine according to claim 1, wherein said predetermined angle (θ) is within the range from 10 degrees to 20 degrees.

3. A supporting structure for an operator cab on a body frame of a work machine according to claim 1, wherein said predetermined angle (θ) is adjustable within a predetermined value.

4. A supporting structure for an operator cab on a body frame of a work machine according to claim 1, wherein all said vibro-isolated means are identical.

5. A supporting structure for an operator cab on a body frame of a work machine according to claim 1, wherein a support point of said vibro-isolating support means disposed at the high floor portion of the floor frame is positioned adjacent a seat reference point for operator or the center of gravity (G) of the operator cab in the vertical direction.

6. A supporting structure for an operator cab on a body frame of a work machine according to claim 5, wherein said predetermined angle (θ) is within the range from 10 degrees to 20 degrees.

7. A supporting structure of an operator cab on a body frame of a work machine according to claim 5, wherein all said vibro-isolated means are identical.

8. A supporting structure of an operator cab on a body frame of a work machine, having a floor frame, said operator cab being mounted on said floor frame, said floor frame having a low floor portion and a high floor portion spaced longitudinally from each other at a forward location and a rearward location in a side view, and a vibro-isolating support means being provided between said low and high floor portions and said body frame so as to support the operator cab resiliently, comprising:

either one of said vibro-isolating support means located at the low floor portion and the high floor portion having a vertical support axis, another vibro-isolating support means having a support axis which inclines longitudinally at a predetermined angle (θ1) from a vertical axis and also inclines laterally at a predetermined angle (θ2) from a vertical axis toward the center of gravity (G) of the operator cab.

9. A supporting structure of an operator cab on a body frame of a work machine according to claim 8, wherein all said vibro-isolated means are identical.

* * * * *